United States Patent
Haneji et al.

(10) Patent No.: US 9,157,631 B2
(45) Date of Patent: Oct. 13, 2015

(54) METHOD FOR BURNING BURNER (75) Inventors: Tomoyuki Haneji, Kai (JP); Kimio Iino, Kai (JP); Yasuyuki Yamamoto, Hokuto (JP); Yoshiyuki Hagihara, Kofu (JP)

(73) Assignee: TAIYO NIPPON SANSO CORPORATION, Tokyo (JP)

(*) Notice: Subject to any disclaimer, the term of this patent is extended or adjusted under 35 U.S.C. 154(b) by 554 days.

(21) Appl. No.: 13/582,020

(22) PCT Filed: Feb. 15, 2011

(86) PCT No.: PCT/JP2011/053112
§ 371 (c)(1),
(2), (4) Date: Aug. 30, 2012

(87) PCT Pub. No.: WO2011/108351
PCT Pub. Date: Sep. 9, 2011

(65) Prior Publication Data
US 2012/0328994 A1 Dec. 27, 2012

(30) Foreign Application Priority Data
Mar. 1, 2010 (JP) ................. 2010-044262

(51) Int. Cl.
*F23C 15/00* (2006.01)
*F23C 99/00* (2006.01)
(Continued)

(52) U.S. Cl.
CPC ................. *F23C 99/00* (2013.01); *F23L 7/007* (2013.01); *F23N 1/022* (2013.01); *F23C 2205/00* (2013.01); *F23L 2900/07007* (2013.01); *F23N 2037/26* (2013.01); *Y02E 20/344* (2013.01)

(58) Field of Classification Search
CPC .. F23C 15/00; F23C 2205/10; F23C 2205/20; F23C 2205/00; F23D 14/323; F24C 15/00
USPC .......................................... 431/1, 12
See application file for complete search history.

(56) References Cited

U.S. PATENT DOCUMENTS 4,113,445 A * 9/1978 Gettert et al. ................ 48/197 R
4,443,183 A * 4/1984 Shimizu et al. ............... 431/354
(Continued)

FOREIGN PATENT DOCUMENTS

CN 1111743 A 11/1995
CN 1210221 A 3/1999
(Continued)

OTHER PUBLICATIONS

Jarry, WO 03083372 A1—English machine translation.*
(Continued)

*Primary Examiner* — Jorge Pereiro
(74) *Attorney, Agent, or Firm* — Nixon & Vanderhye P.C.

(57) ABSTRACT

The object of the present invention is to provide a method for burning a burner which has NOx reduction effects and has practical value, and a device therefore; the present invention provide A method for burning a burner in a heating furnace including a step of: periodically changing at least one of a flow rate of a fuel fluid and a flow rate of an oxidizing agent fluid which are supplied to the burner while periodically changing an oxygen concentration in the oxidizing agent fluid, thereby an oxygen ratio which is calculated by dividing an amount of oxygen supplied by a theoretical necessary amount of oxygen is periodically changed, and the periodical change of the oxygen ratio is made different from the periodical change of the oxygen concentration to cause combustion in periodically vibrational conditions.

15 Claims, 9 Drawing Sheets

FLOW RATE OF OXYGEN

FLOW RATE OF AIR (51) Int. Cl.
*F23L 7/00* (2006.01)
*F23N 1/02* (2006.01)

(56) References Cited

U.S. PATENT DOCUMENTS

| | | | | |
|---|---|---|---|---|
| 4,547,150 | A | * | 10/1985 | Vereecke ............... 432/12 |
| 4,642,047 | A | * | 2/1987 | Gitman ............... 432/13 |
| 4,745,941 | A | * | 5/1988 | Nilsson ............... 137/114 |
| 4,846,665 | A | * | 7/1989 | Abbasi ............... 431/1 |
| 5,145,361 | A | * | 9/1992 | Kurzinski ............... 432/19 |
| 5,302,111 | A | * | 4/1994 | Jouvaud et al. ............... 431/1 |
| 5,454,712 | A | * | 10/1995 | Yap ............... 431/10 |
| 5,456,594 | A | * | 10/1995 | Yap ............... 431/1 |
| 5,522,721 | A | * | 6/1996 | Drogue et al. ............... 431/1 |
| 5,871,343 | A | * | 2/1999 | Baukal et al. ............... 431/10 |
| 6,155,818 | A | * | 12/2000 | Joshi et al. ............... 431/12 |
| 6,200,128 | B1 | * | 3/2001 | Kobayashi ............... 431/5 |
| 6,283,747 | B1 | * | 9/2001 | Legiret et al. ............... 432/12 |
| 8,505,496 | B2 | * | 8/2013 | Douglas et al. ............... 122/4 D |
| 2003/0134241 | A1 | * | 7/2003 | Marin et al. ............... 431/9 |
| 2006/0177785 | A1 | * | 8/2006 | Varagani et al. ............... 431/12 |
| 2008/0292999 | A1 | * | 11/2008 | Koder et al. ............... 431/1 |
| 2009/0239182 | A1 | | 9/2009 | Tsiava et al. |

FOREIGN PATENT DOCUMENTS

| | | | |
|---|---|---|---|
| CN | 101091089 A | 12/2007 | |
| CN | 101201163 A | 6/2008 | |
| CN | 101490476 A | 7/2009 | |
| EP | 0 046 898 A1 | 3/1982 | |
| EP | 0 046 898 B1 | 2/1984 | |
| JP | 5-215311 | 8/1993 | |
| JP | A-05-215311 | 8/1993 | |
| JP | 6-213411 | 8/1994 | |
| JP | 10-141629 | 5/1998 | |
| JP | A-10-141629 | 5/1998 | |
| JP | 2000-171005 | 6/2000 | |
| JP | 2000-171032 | 6/2000 | |
| JP | A-2000-171032 | 6/2000 | |
| JP | 2001-165410 | 6/2001 | |
| JP | 2001-311505 | 11/2001 | |
| JP | A-2001-311505 | 11/2001 | |
| WO | WO 03083372 A1 * | 10/2003 | ............... F23L 7/00 |

OTHER PUBLICATIONS

Extended European Search Report issued in European Patent Application No. 11750464.7 dated Dec. 9, 2014.

International Search Report for PCT/JP2011/053112, mailed Mar. 22, 2011.

CN Office Action and English translation of Search Report in CN 201180011715.1 dated May 19, 2014.

* cited by examiner

METHOD FOR BURNING BURNER

TECHNICAL FIELD

The present invention relates to a method for burning a burner.

This application is the U.S. national phase of International Application No. PCT/JP2011/053112, filed 15 Feb. 2011, which designated the U.S. and claims priority to Japanese Patent Application No. 2010-044262, filed Mar. 1, 2010, the entire contents of each of which are incorporated herein by reference.

BACKGROUND ART

At the present time when global environment problems attract people's attention, reduction of nitrogen oxides is one of important problems to be solved, and is an urgent task. In methods for reducing NOx, it is important to inhibit the NOx generation. As the method for inhibition of NOx generation, recycling of exhaust gas, lean combustion, thick and thin combustion, staged combustion, and the like can be given as examples. These methods have been widely used for industrial use or consumers. Although NOx reduction can be partially achieved by low-NOx combustors adopting these technique, a NOx reduction method, which is further effective, have been requested.

As one method for reducing NOx, which has been researched and developed from the past, there is a method (below, it is called forced vibration combustion) in which flow rate of fuel, and air which is an oxidizing agent and the like are periodically changed. Thereby, a kind of temporal thick and thin combustion is carried out (Patent Documents No. 1 to 6).

In these methods, flow rate of a fuel fluid or an oxidizing agent fluid, or flow rate of both a fuel fluid and an oxidizing agent fluid are changed to change the theoretical mixture ratio in combustion flame, and thereby making combustion in fuel rich conditions and fuel lean conditions alternatively.

In addition, Patent Document No. 7 discloses a method for reducing nitrogen oxide by using pure oxygen as an oxidizing agent, and utilizing pulsation combustion in fuel rich conditions, so called forced vibration combustion, and a device for carrying out the method.

PRIOR DOCUMENTS

Patent Document

[Patent Document 1] European Patent No. 0 046 898 B1
[Patent Document 2] U.S. Pat. No. 4,846,665
[Patent Document 3] Japanese Unexamined Patent Application, First Publication No. H 06-213411
[Patent Document 4] Japanese Unexamined Patent Application, First Publication No. 2000-171005
[Patent Document 5] Japanese Unexamined Patent Application, First Publication No. 2000-1710032
[Patent Document 6] Japanese Unexamined Patent Application, First Publication No. 2001-311505
[Patent Document 7] Japanese Unexamined Patent Application, First Publication No. H 05-215311

SUMMARY OF INVENTION

Technical Problem

However, when the present inventors carried out supplementary examinations in order to confirm the NOx reduction effects obtained by these prior art, they found that some of prior art have NOx reduction effects, but none of them could not obtain practical NOx reduction effects.

The problem to be solved by the present invention is to provide a method for burning a burner which has NOx reduction effects, which are remarkably larger than that of the prior art and has practical value, and a device therefore.

Solution to Problem

When the present inventors were diligently studying to achieve a method for reducing NOx which has practical value, they found that NOx reduction effects, which are much larger than that obtained by prior art, can be obtained by periodically changing the flow rate of at least one of feel fluid and oxidizing agent fluid which are supplied to a burner while periodically changing the oxygen concentration in the oxidizing agent, fluid to make forced vibration combustion.

The invention according to Claim 1 relates to a method for burning a burner in a heating furnace including a step of periodically changing at least one of a flow rate of a fuel fluid and a flow rate of an oxidizing agent fluid which are supplied to the burner while periodically changing an oxygen concentration in the oxidizing agent fluid, thereby an oxygen ratio which is calculated by dividing an amount of oxygen supplied by a theoretical necessary amount of oxygen is periodically changed, and the periodical change of the oxygen ratio is made different from the periodical change of the oxygen concentration to cause combustion in periodically vibrational conditions.

The invention according to Claim 2 relates to a method for burning a burner according to Claim 1, wherein the periodical change of the flow rate of the fuel fluid is different from the periodical change of the oxygen concentration and the oxygen ratio.

The invention according to Claim 3 relates to a method for burning a barrier according to Claim 1 or 2, wherein frequency of the periodical change of the oxygen ratio is 20 Hz or less.

The invention according to Claim 4 relates to a method for burning a burner according to any one of Claims 1 to 3, wherein frequency of the periodical change of the oxygen ratio is 0.02 Hz or more.

The invention according to Claim 5 relates to a method for burning a burner according to any one of Claims 1 to 4, wherein the difference between an upper limit and a lower limit of the oxygen ratio which periodically changes is 0.2 or more, and an average oxygen ratio in one period is 1.0 or more.

The invention according to Claim 6 relates to a method for burning a burner according to any one of Claims 1 to 5, wherein the periodical change of the oxygen ratio and the oxygen concentration has the same frequency.

The invention according to Claim 7 relates to a method for burning a burner according to Claim 6, wherein a phase difference between the periodical change of the oxygen ratio and the oxygen concentration is in a range from $\pi/2$ to $3\pi/2$.

The invention according to Claim 8 relates to a method for burning a burner according to Claim 7, wherein a phase difference between the periodical change of the oxygen ratio and the oxygen concentration is $\pi$.

The invention according to Claim 9 relates to a method for burning a burner according to any one of Claims 1 to 8, wherein the periodical change of the flow rate of the fuel fluid and the oxygen ratio has the same frequency; and a phase difference between the periodical change of the flow rate of the fuel fluid and the oxygen ratio is in a range from $\pi/2$ to $3\pi/2$.

The invention according to Claim 10 relates to a method for burning a burner according to Claim 9, wherein, a phase difference between the periodical change of the oxygen concentration and the oxygen ratio is $\pi$.

The invention according to Claim 11 relates to a method for burning a burner according to any one of Claims 1 to 10, wherein the oxidizing agent fluid contains oxygen and air.

The invention according to Claim 12 relates to a method for burning a burner according to any one of Claims 1 to 10, wherein the oxidizing agent fluid contains oxygen and combustion exhaust gas.

The invention according to Claim 13 relates to a method for burning a burner according to Claim 11 or 12, wherein the oxygen is substantially pure oxygen.

Advantageous Effects of Invention

According to the present invention, it is possible to obtain a method for burning a burner which can reliably and remarkably reduce NOx. The present invention can be used not only when a new heating furnace is built but also to a combustion burner in an existing heating furnace.

DESCRIPTION OF EMBODIMENTS

Below, a method for burning a burner which is one embodiment of the present invention will be explained in detail referring to figures. Moreover, figures used in the following explanations may be partially enlarged to show the features, and the scale size in components is not always the same.

[Combustion Device]

Figure 1:
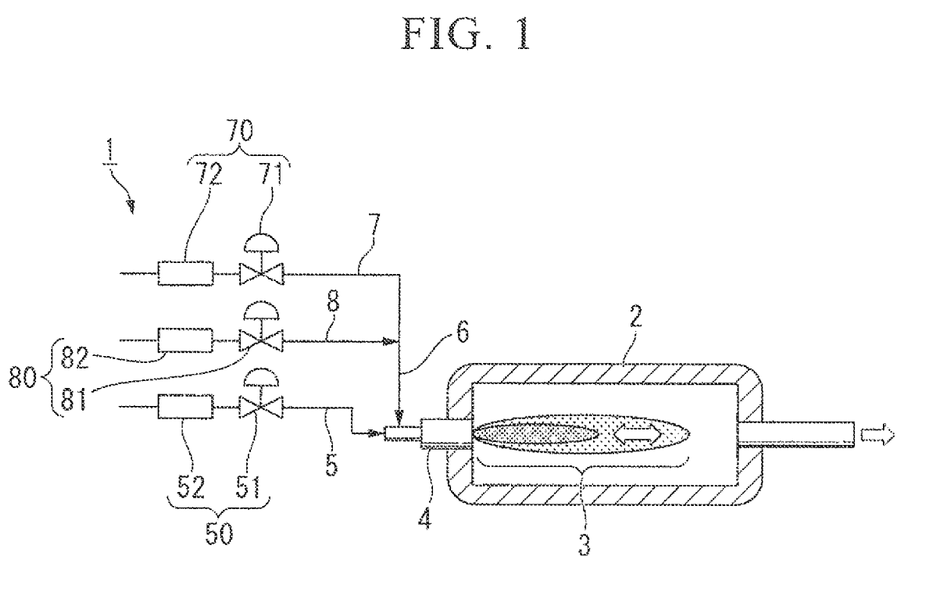
FIG. 1 is a figure showing a combustion device in one embodiment of the present invention.

As shown in FIG. 1, the combustion device 1 used in the embodiment according to the present invention includes a burner 4 for forming a combustion flame 3 in a heating furnace 2, a fuel supply pipe 5 for supplying a fuel fluid which is connected to the burner 4, and an oxidizing agent supply pipe 6 for supplying an oxidizing agent fluid which is connected to the burner 4. The upstream portion of the oxidizing agent supply pipe 6 is branched to form an oxygen supply pipe 7 and an air supply pipe 8.

In addition, a forced vibration device 50, 70, and 80 for forcibly vibrating fluid supplied from the pipe is provided to the fuel supply pipe 5, the oxygen supply pipe 7, and the air supply pipe 8, respectively.

In the present invention, "forcibly vibrating fluid" means periodically adjusting the flow rate of fluid. Specifically, the forced vibration device means a control unit including open-close valves 51, 71, and 81 and control devices 52, 72, and 82 for controlling the open-close valves 51, 71, and 81, which are provided to the supply pipes 5, 7, and 8.

Any fuel can be used as the fuel supplied by the fuel supply pipe 5 as long as it is suitably used as fuel for the burner, for example, liquefied natural gas (LNG), and the like can be used.

From the oxygen, supply pipe 7, oxygen is supplied. However, the oxygen is not always required to be pure oxygen. Oxygen having a suitable concentration based on the oxygen concentration explained below can be used.

From the air supply pipe 8, air is supplied. As the air, combustion exhaust gas can also be used in addition to the atmosphere. When combustion exhaust gas is used, the oxygen concentration can be reduced less than 21% (oxygen concentration in air).

In the combustion device 1 in this embodiment, various detectors (not shown in figures) are preferably provided in the heating furnace 2 in order to respond to the conditions in the heating furnace 2. In addition, it is also preferable that the combustion device 1 have a sequence program for grasping the conditions in the heating furnace 2 based on data detected by the detectors, and suitably and automatically adjusting the flow rate of the fuel fluid or the oxidizing agent fluid, the forced vibration period, and the like.

[Flow Rate of Oxidizing Agent Fluid and Oxygen Concentration of Oxidizing Agent Fluid]

Next, the flow rate of the oxidizing agent fluid and the oxygen concentration of the oxidizing agent fluid will be explained.

Moreover, for convenience, it is assumed that pure oxygen, air (oxygen concentration is about 21%), and liquefied natural gas (LNG) are supplied from the oxygen supply pipe 7, the air supply pipe 8, and the fuel supply pipe 5 respectively.

In this embodiment, the oxidizing agent fluid contains pure oxygen and air. By the forced vibration devices 70 and 80, one or both of the flow rate of pure oxygen supplied from the oxygen supply pipe 7 and the flow rate of air supplied from the air supply pipe 8 are controlled so as to periodically vibrate with time.

The flow rate of the pure oxygen and air can be freely controlled as long as the oxygen concentration in the oxidizing agent fluid is periodically changed. In addition, the total flow rate of the pure oxygen and air (that is, the flow rate of the oxidizing agent fluid) may be fixed or periodically changed.

Figure 2:
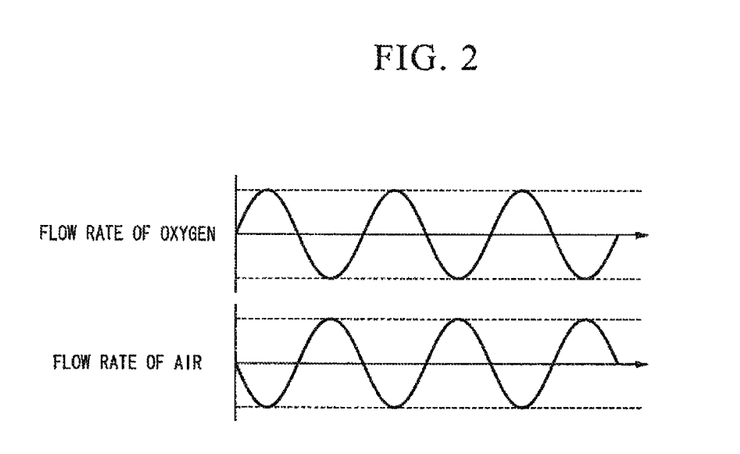
FIG. 2 is a figure showing periodical changes of a flow rate of oxygen and air in one embodiment of the present invention.

In order to fix the flow rate of the oxidizing agent fluid, for example, as shown in FIG. 2, the periodical change of the flow rate of the pure oxygen and air is adjusted to have the same waveform, the same changing range, and the phase difference of π. Thereby, increase and decrease of the flow rate of the pure oxygen and air is offset, and the flow rate of the oxidizing agent fluid supplied to the burner 4 is adjusted to a fixed value.

In addition, in this case, it is preferable that the minimum flow rate of the pure oxygen and air is adjusted to be 0. Thereby, it is possible to change the oxygen concentration of the oxidizing agent fluid within a range from about 21% to 100%.

In other words, when the flow rate of the pure oxygen in the oxidizing agent fluid is 0, the oxygen concentration of the oxidizing agent is equal to the oxygen concentration in air, that is, about 21%. In contrast, when the flow rate of air in the oxidizing agent is 0, the oxidizing agent fluid is pure oxygen, and the oxygen concentration is 100%.

Moreover, in order to fix the flow rate of the oxidizing agent fluid, the flow rate of the fuel fluid should be periodically changed.

Figure 3:
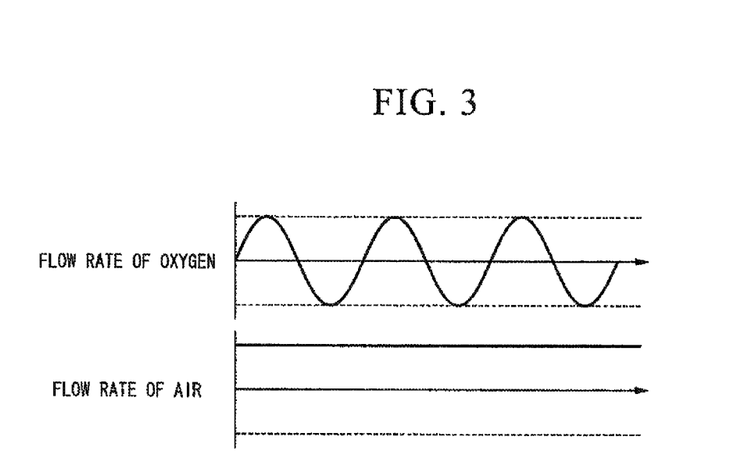
FIG. 3 is a figure showing another periodical change of a flow rate of oxygen and a flow rate of an air in one embodiment of the present invention.

On the other hand, in order to periodically change the flow rate of the oxidizing agent fluid, for example, as shown in FIG. 3, while flow rate of air is fixed, the flow rate of the pure oxygen should be periodically changed. In this case, when the flow rate of the pure oxygen is at its maximum, the oxygen concentration of the oxidizing agent fluid is at its maximum. In contrast; when the flow rate of the pure oxygen is at its minimum, the oxygen concentration of the oxidizing agent fluid is at its minimum.

For example, by controlling the flow rate of the pure oxygen such that the maximum flow rate of the pure oxygen is adjusted to the flow rate of air, and minimum flow rate thereof is adjusted to 0, the oxygen concentration of the oxidizing agent fluid is periodically changed within a range from about 21% to about 61%. That is, when the flow rate of the pure oxygen is at its maximum, the flow ratio between the pure oxygen and air is 1:1, and the oxygen concentration in the oxidizing agent fluid is about 61%. In contrast, when the flow rate of the pure oxygen is at its minimum, the oxidizing agent fluid contains only air, and the oxygen concentration is about 21%.

Moreover, as a method for periodically changing the flow rate of the oxidizing agent fluid, a method, in which the flow rate of air is fixed and the flow rate of the pure oxygen is periodically changed, is explained above. However, it is possible to fix the flow rate of the pure oxygen and periodically change the flow rate of air. In addition, it is also possible to periodically change the flow rate of both of the pure oxygen and air.

[Flow Rate of Fuel Fluid]

When the flow rate of the oxidizing agent fluid is periodically changed, the flow rate of the fuel fluid may be fixed or periodically changed in this embodiment.

[Oxygen Ratio]

Next, the oxygen ratio will be explained. In the present invention, "oxygen ratio" means the value which is calculated by dividing the amount of oxygen supplied to the burner 4 as the oxidizing agent fluid by a theoretical necessary amount of oxygen for combustion of the fuel fluid supplied to the burner 4. That is, when the oxygen ratio is 1.0, the perfect combustion using oxygen without excess or deficiency is caused.

Moreover, the theoretical necessary amount of oxygen in LNG combustion varies depending on the composition of LNG. However, it is about 2.3 times the amount of LNG in mole ratio.

In this embodiment, at least one of the flow rate of the fuel fluid and the oxidizing agent fluid is periodically changed, and the oxygen concentration of the oxidizing agent fluid is also periodically changed. Therefore, the oxygen ratio is also periodically changed.

For example, in a case that the flow rate of the oxidizing agent fluid is fixed, and the flow rate of the pure oxygen and air is periodically changed (the oxygen concentration: about 21% to about 100%), as shown in FIG. 2, the flow rate of the fuel fluid is periodically changed. In this case, when the flow rate of the oxidizing agent fluid is 1, and the flow rate of the fuel fluid (LNG) is periodically changed within a range from 0.05 to 0.65, the oxygen ratio is periodically changed within a range from 0.14 to 8.7.

In a case that the flow rate of the oxidizing agent, fluid is periodically changed, it is possible to fix the flow rate of the fuel fluid. As shown in FIG. 3, when the flow rate of air is fixed and the flow rate of the pure oxygen is periodically changed (the oxygen concentration: about 21% to about 61%), and when the flow rate of the oxidizing agent fluid is changed within a range from 1 to 2 and the fuel fluid (LNG) is supplied at the flow rate of 0.3, the oxygen ratio is periodically changed within a range from 0.3 to 1.75.

Figure 4:
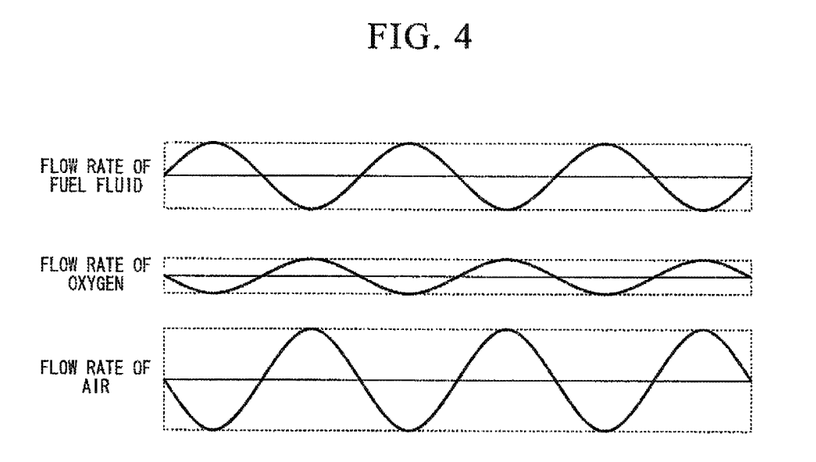
FIG. 4 is a figure showing periodical changes of a flow rate of fuel, oxygen, and air in one embodiment of the present invention.

In addition, as shown in FIG. 4, by periodically changing the flow rate of the oxidizing agent fluid and fuel fluid, it is possible to change the combustion load (calories supplied into the heating furnace) while periodically changing the oxygen concentration of the oxidizing agent and the oxygen ratio.

For example, when the flow rate of the fuel fluid, oxygen, and air is respectively changed within a range from 0.5 to 1.5, a range from 1.2 to 1.7, and a range from 0 to 9.2, the oxygen ratio is periodically changed within a range from 0.5 to 2.7, and the oxygen concentration is also periodically changed within a range from 30% to 100%.

In addition, the flow rate of the fuel fluid, pure oxygen, and air is suitably controlled by the forced vibration device such that the periodical change of the oxygen ratio is different from the periodical change of the oxygen concentration.

In the present invention, the statement "the periodical change of the oxygen ratio is different from the periodical change of the oxygen concentration" means that the periodical change of the oxygen ratio is not perfectly the same as the periodical change of the oxygen concentration in the waveform, frequency; and phase difference. Specifically, in a case that the waveform of the periodical change of the oxygen ratio and the oxygen concentration are both sine waves and the frequency thereof is the same, when there is a phase difference between them, it denotes that the periodical change of the oxygen ratio is different from the periodical change of the oxygen concentration.

In addition, when the frequency of the periodical change of the oxygen ratio is large, the NOx reduction effects are not sufficiently obtained. Therefore, it is preferable that the frequency of the periodical change of the oxygen ratio be 20 Hz or less. In contrast, when the frequency is too small, the amount of CO generated becomes large. Therefore, it is preferable that the frequency be 0.02 Hz or more.

In addition, when the difference between the upper limit and the lower limit of the oxygen ratio is small, the NOx reduction effects are not sufficiently obtained. Therefore it is preferable that the difference between the upper limit and the lower limit of the oxygen ratio be 0.2 or more. The difference between the upper limit and the lower limit of the oxygen ratio is preferably 5.5 or less.

In addition, when the average time in one period of oxygen ratio is small, the fuel fluid is incompletely combusted, therefore, the average time is preferably 1.0 or more, and more preferably 1.05 or more. Moreover, the average time is preferably 1.5 or less.

In addition, it is preferable that the periodical change of the oxygen ratio and the periodical change of the oxygen concentration of the oxidizing agent fluid have the same frequency. Furthermore, when they have the same frequency, the phase difference between them is preferably within a range from $\pi/2$ to $3\pi/2$, and more preferably $\pi$. In addition, it is preferable that the periodical change of the flow rate of the fuel fluid, the oxygen ratio, and the oxygen concentration have the same frequency. When they have the same frequency, it is preferable that the phase difference between the periodical change of the flow rate of the fuel fluid and the periodical change of the oxygen ratio be within a range from $\pi/2$ to $3\pi/2$, and more preferably $\pi$.

According to the method for burning a burner in this embodiment explained above, it is possible to reliably and remarkably reduce the amount of NOx generated. In addition, the method can be used not only when a new heating furnace is built but also to a combustion burner in an existing heating furnace.

The present invention is explained above referring to the embodiments. However, of course, the present invention is not limited to the embodiments, and various constitutions can be changed as far as the change of the constitution is within the scope of the present invention.

For example, the amount of the fuel fluid and oxidizing agent fluid supplied may be periodically changed so as to have not only a sine wave but also a rectangular wave, or a triangular wave.

Below, the NOx reduction effects, which are obtained when the fuel fluid is LNG, the oxidizing agent fluid having the oxygen concentration, of 99.6% contains oxygen and air, and the oxygen ratio and the oxygen concentration in the oxidizing agent fluid are periodically changed, are explained below referring to Examples. The present invention is not limited to the following Examples, and various constitutions can be changed as far as the change of the constitution is within the scope of the present invention.

Example 1

In Example 1, combustion tests were carried out by fixing the flow rate of LNG, and changing the flow rate of oxygen and air, and thereby periodically changing the oxygen ratio and the oxygen concentration in the combustion device shown in FIG. 1.

The oxygen concentration of the oxidizing agent fluid was periodically changed within a range from 33 to 100%, and the oxygen ratio was also periodically changed within a range from 0.5 to 1.6. In this time, the oxygen concentration in the oxidizing agent fluid and the oxygen ratio at the average time were each adjusted to 40% and 1.05.

When analyzing the test results, the NOx concentration in the combustion exhaust gas produced by a conventional oxygen rich combustion using the same combustion device was measured, and the obtained measured value is used as a standard NOx (ref).

When the frequency of both the oxygen concentration of the oxidizing agent fluid and the oxygen ratio was adjusted to 0.033 Hz, and the phase difference between them was adjusted to $\pi$, about 83% of the NOx concentration was reduced compared with the NOx (ref).

Comparative Example 1

The combustion tests were carried out in the same manner as in Example 1, except that only the oxygen ratio was periodically changed. When the oxygen concentration of the oxidizing agent fluid was fixed to 40%, the oxygen ratio was periodically changed within a range from 0.5 to 1.6 at frequency of 0.033 Hz, only about 58% of the NOx concentration was reduced compared with the NOx (ref).

Example 2

In Example 2, in a case that the oxygen concentration of the oxidizing agent fluid is periodically changed, the effects of frequency to the NOx reduction effects were examined.

When the frequency of the periodical change of the oxygen concentration of the oxidizing agent fluid and the oxygen ratio was adjusted to 0.017 Hz, 0.02 Hz, 0.025 Hz, 0.033 Hz, 0.067 Hz, 0.2 Hz, 1 Hz, 5 Hz, 10 Hz, 20 Hz, 25 Hz, 50 Hz, and 100 Hz, the NOx concentration in the exhaust, gas was measured. Moreover, the combustion tests were carried out in the same manner as in Example 1, except that, the phase difference between the oxygen concentration and the oxygen ratio was adjusted to $\pi$, and the frequency of the periodical change of the oxygen concentration of the oxidizing agent fluid and the oxygen ratio was adjusted as explained above, thereby the oxygen concentration at the average time of in the oxidizing agent fluid was 40%, and the oxygen ratio at the average time was 1.05. The results are shown in Table 1 and FIG. 5.

Figure 5:
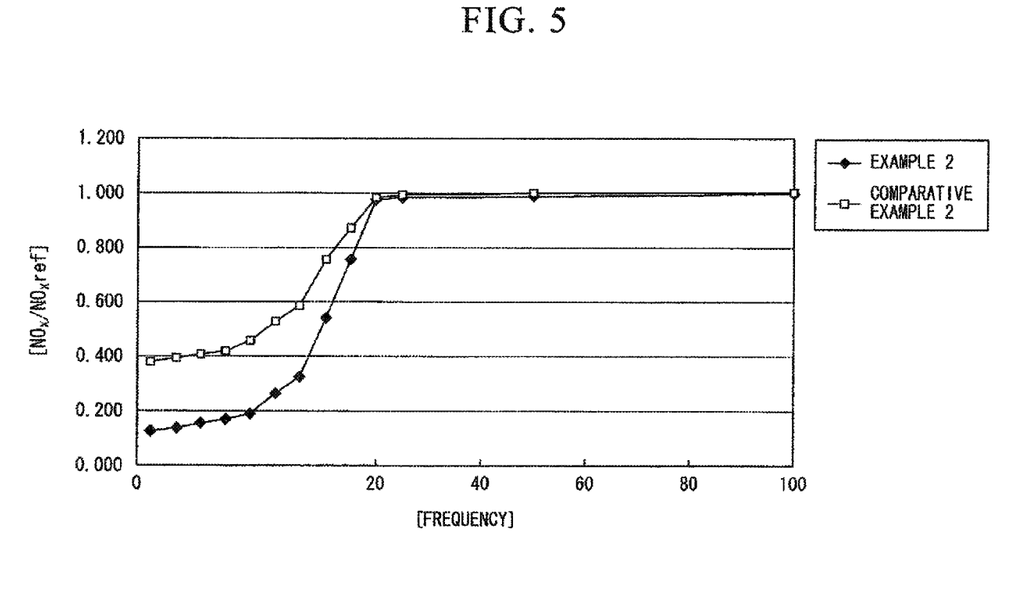
FIG. 5 is a graph showing a relationship between frequency and NOx concentration in one Example of the present invention.

Moreover, in Table 5, the horizontal axis shows the frequency of the oxygen concentration and the oxygen ratio, and the vertical axis shows a ratio between the NOx concentration and NOx (ref) (NOx/NOx (ref)).

Comparative Example 2

In order to compare with Example 2, in Comparative Example 2, the oxygen concentration was fixed to 40%, and only the oxygen ratio was changed within a range from 0.5 to 1.6. Thereby the forced vibration combustion was carried out, and NOx reduction effects were examined. The results are shown in Table 1 and FIG. 5, together with the results of Example 2.

TABLE 1

| Period | Hz | NOx/NOx (ref) Example 2 | NOx/NOx (ref) Comparative Example 2 |
|---|---|---|---|
| 60 | 0.017 | 0.128 | 0.383 |
| 50 | 0.02 | 0.138 | 0.396 |
| 40 | 0.025 | 0.154 | 0.409 |
| 30 | 0.033 | 0.168 | 0.419 |
| 15 | 0.067 | 0.190 | 0.455 |
| 5 | 0.2 | 0.264 | 0.528 |
| 1 | 1 | 0.324 | 0.584 |
| 0.2 | 5 | 0.541 | 0.757 |
| 0.1 | 10 | 0.757 | 0.872 |
| 0.05 | 20 | 0.973 | 0.983 |
| 0.04 | 25 | 0.982 | 0.993 |
| 0.02 | 50 | 0.986 | 0.996 |
| 0.01 | 100 | 0.995 | 0.999 |

It is clear from FIG. 5 that when the frequency of the periodical change of the oxygen concentration of the oxidizing agent fluid and oxygen ratio is small, large NOx reduction effects can be obtained. In addition, by changing the oxygen concentration and the oxygen ratio at the same time, NOx can be remarkably reduced. Furthermore, it is also clear that, in the range tested, when the frequency is smaller, larger NOx reduction effects can be obtained. In particular, when the frequency was 20 Hz, NOx reduction effects were suddenly obtained. In both cases, the present invention had larger NOx reduction effects than when only the oxygen ratio was periodically changed.

Example 3

Next, in Example 3, the influence of the frequency to the CO concentration in the exhaust gas when the oxygen concentration and the oxygen ratio were periodically changed was examined.

Specifically, when the frequency of the periodical change of the oxygen concentration and the oxygen ratio was 0.017 Hz, 0.02 Hz, 0.025 Hz, 0.033 Hz, 0.067 Hz, 0.2 Hz, 1 Hz, 5 Hz, 10 Hz, 20 Hz, 25 Hz, 50 Hz, and 100 Hz, the CO concentration of the exhaust gas was measured. Moreover, the phase difference between the oxygen concentration and the oxygen ratio was adjusted to π. The combustion tests were carried out in the same manner as in Example 1, except that the frequency of the oxygen concentration and the oxygen ratio were changed as explained above, and thereby the oxygen concentration at the average time in the oxidizing agent fluid was 40%, and the oxygen ratio at the average time was 1.05. The results are shown in Table 2 and FIG. 6.

Figure 6:
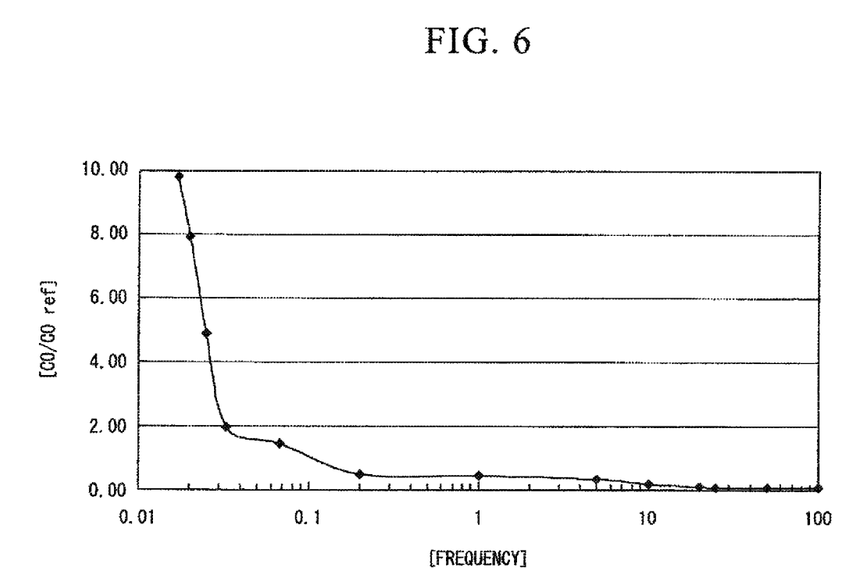
FIG. 6 is a graph showing a relationship between frequency and CO concentration in one Example of the present invention.

When analyzing the test results, the CO concentration in the combustion exhaust gas produced by a conventional oxygen rich combustion using the same combustion device was measured, and the obtained measured value is used as a standard CO (ref). In FIG. 6S the horizontal axis shows the frequency of the oxygen concentration and the oxygen ratio, and the vertical axis shows a ratio between the CO concentration and CO (ref)(CO/COx(ref)).

TABLE 2

| Period | Hz | CO/COx (ref) Example 3 |
|---|---|---|
| 60 | 0.017 | 9.80 |
| 50 | 0.02 | 7.91 |
| 40 | 0.025 | 4.88 |
| 30 | 0.033 | 1.98 |
| 15 | 0.067 | 1.44 |
| 5 | 0.2 | 0.48 |
| 1 | 1 | 0.44 |
| 0.2 | 5 | 0.32 |
| 0.1 | 10 | 0.20 |
| 0.05 | 20 | 0.10 |
| 0.04 | 25 | 0.08 |
| 0.02 | 50 | 0.06 |
| 0.01 | 100 | 0.06 |

It is clear from FIG. 6 that when the frequency is 0.02 or less, the CO concentration remarkably and suddenly increases.

In summary, when the CO concentration is also required to be decreased, although the NOx reduction effects are small, but the frequency is preferable 0.02 or more.

Example 4

Next, when the amount of the fuel fluid supplied was fixed, the influence of the range of change in the oxygen ratio to the NOx reduction effects was examined. The NOx concentration was measured by periodically changing the oxygen concentration within a range from 30 to 100%, and changing the upper and lower limits of the oxygen ratio. Specifically, the NOx concentration in the exhaust gas was measured by changing the upper limit of the oxygen ratio within a range from 1.1 to 7 in each case in that the lower limit of the oxygen ratio was adjusted to 0.1, 0.2, 0.3, 0.4, and 0.5. The results are shown in Table 3 and FIG. 7.

Moreover, the oxygen ratio at the average time was adjusted to 1.05, and the oxygen concentration in the oxidizing agent fluid at the average time was adjusted to 40%. Specifically, for example, when the oxygen ratio (m) is in a range from 0.5 to 5, the period of time in which the oxygen ratio (m)<1.05 was adjusted to be longer than the period of time in which the oxygen ratio (m)>1.05. In contrast, when the oxygen ratio (m) is in a range from 0.2 to 1.2, the period of time in which the oxygen ratio (m)<1.05 was adjusted to be shorter than the period of time in which the oxygen ratio (m)>1.05.

Since the average of the oxygen ratio and the oxygen concentration are fixed, the amount of oxygen used in a fixed time is the same.

Figure 7:
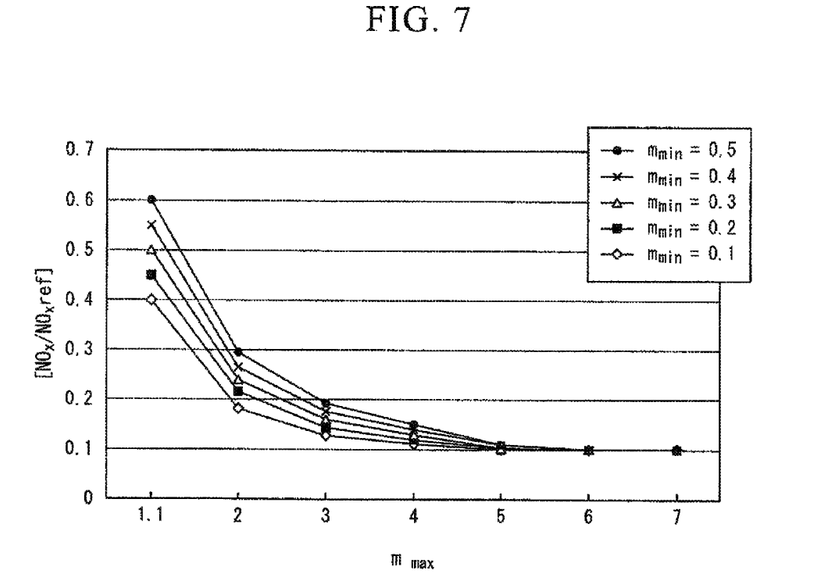
FIG. 7 is a graph showing a relationship between the oxygen ratio and NOx concentration in another Example of the present invention.

Moreover, in FIG. 7, the horizontal axis shows the maximum oxygen ratio $m_{max}$, and the vertical axis shows a ratio between the NOx concentration and NOx (ref) (NOx/NOx (ref)). In FIG. 7, for example, the NOx concentration ratio, when, the oxygen ratio (m) is periodically changed within a range from 0.5 to 2 (the minimum oxygen ratio $m_{min}$ is 0.5), is a value (0.3) corresponding to the point $m_{max}$ in the horizontal axis being 2 in a curve in which $m_{min}$=0.5.

TABLE 3

| | $m_{min}$ | | | | |
|---|---|---|---|---|---|
| $m_{max}$ | 0.1 | 0.2 | 0.3 | 0.4 | 0.5 |
| 1.1 | 0.4 | 0.45 | 0.5 | 0.55 | 0.6 |
| 2 | 0.184 | 0.216 | 0.24 | 0.264 | 0.296 |
| 3 | 0.128 | 0.144 | 0.16 | 0.176 | 0.192 |
| 4 | 0.11 | 0.12 | 0.13 | 0.14 | 0.15 |
| 5 | 0.1 | 0.1 | 0.1 | 0.11 | 0.11 |
| 6 | 0.1 | 0.1 | 0.1 | 0.1 | 0.1 |
| 7 | 0.1 | 0.1 | 0.1 | 0.1 | 0.1 |

It is clear from FIG. 7 when $m_{min}$ is 0.5 and $m_{max}$ becomes larger (that is, changing range of the oxygen ratio becomes lager), the concentration of NOx becomes smaller. However, when $m_{max}$>5, the concentration of NOx is fixed.

In addition, it is also clear from FIG. 7 that the concentration of NOx when $m_{min}$ is 0.3 is smaller than that the concentration of NOx when $m_{min}$ is 0.5. However, there is little difference between the concentration of NOx when $m_{min}$ is 0.3 and 0.2.

Example 5

Next, in Example 5, when the flow rate of the fuel fluid is fixed, the influence of the changing range of the oxygen ratio to the CO concentration in the exhaust gas was examined. Specifically, the CO concentration under the same conditions as those in Example 4 was measured. The results are shown in Table 4 and FIG. 8.

TABLE 4

| | $m_{min}$ | | | | |
|---|---|---|---|---|---|
| $m_{max}$ | 0.1 | 0.2 | 0.3 | 0.4 | 0.5 |
| 1.1 | 3.6 | 0.98 | 0.44 | 0.42 | 0.42 |
| 2 | 4 | 1.02 | 0.47 | 0.44 | 0.43 |
| 3 | 4.5 | 1.15 | 0.54 | 0.5 | 0.48 |
| 4 | 5.2 | 1.58 | 0.66 | 0.58 | 0.54 |
| 5 | 6 | 1.96 | 0.86 | 0.78 | 0.72 |

TABLE 4-continued

| | $m_{min}$ | | | | |
|---|---|---|---|---|---|
| $m_{max}$ | 0.1 | 0.2 | 0.3 | 0.4 | 0.5 |
| 6 | 7 | 3.12 | 1.24 | 1.08 | 0.99 |
| 7 | 9 | 4.8 | 3.84 | 3.32 | 1.96 |

Figure 8:
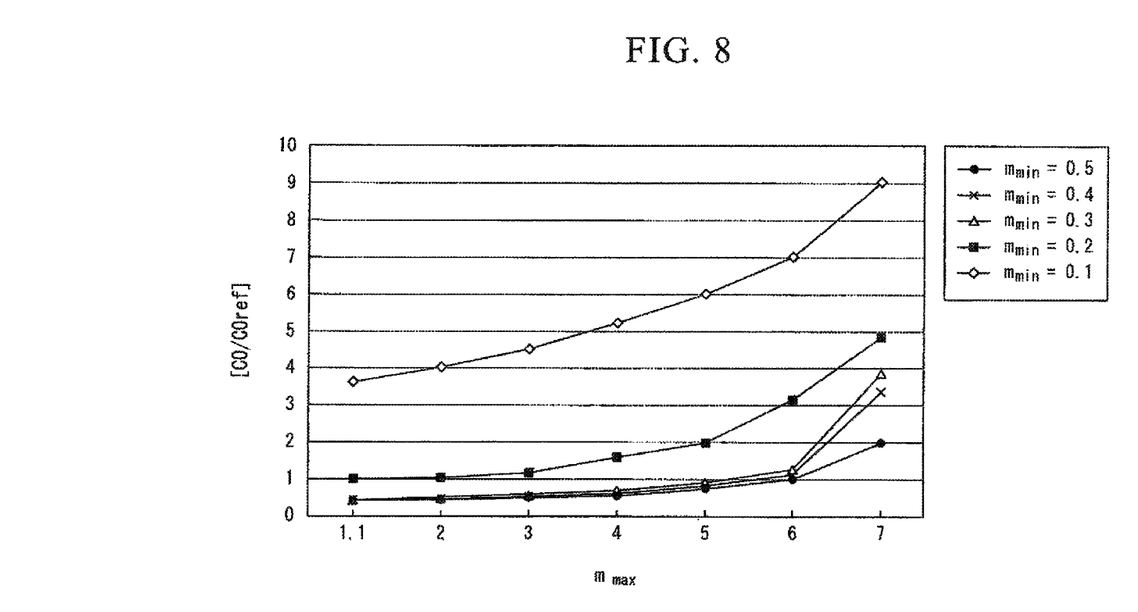
FIG. 8 is a graph showing a relationship between the oxygen ratio and CO concentration in another Example of the present invention.

It is clear from FIG. 8 that when $m_{max}$ is more than 6, the CO concentration suddenly increases. Therefore, when both the CO concentration the NOx in the exhaust gas are required to be decreased, it is preferable that the oxygen ratio be changed within a range from 0.2 to 6 in the present invention.

Example 6

In Example 6, the influence of the changing range of the oxygen concentration to the amount of NOx discharged was examined by fixing the flow rate of the fuel fluid, and changing the oxygen ratio within a range from 0.5 to 1.6. In the tests, the lower limit of the oxygen concentration was adjusted to 33%, and the upper limit of the oxygen concentration was changed within a range from 50 to 100%. The oxygen ratio at the average time was 1.05, and the oxygen concentration at the average time in the oxidizing agent fluid was 40%.

In addition, the frequency of the oxygen ratio and the oxygen concentration was adjusted to 0.067 Hz, and the phase difference was it. The results are shown in Table 5 and FIG. 9.

Figure 9:
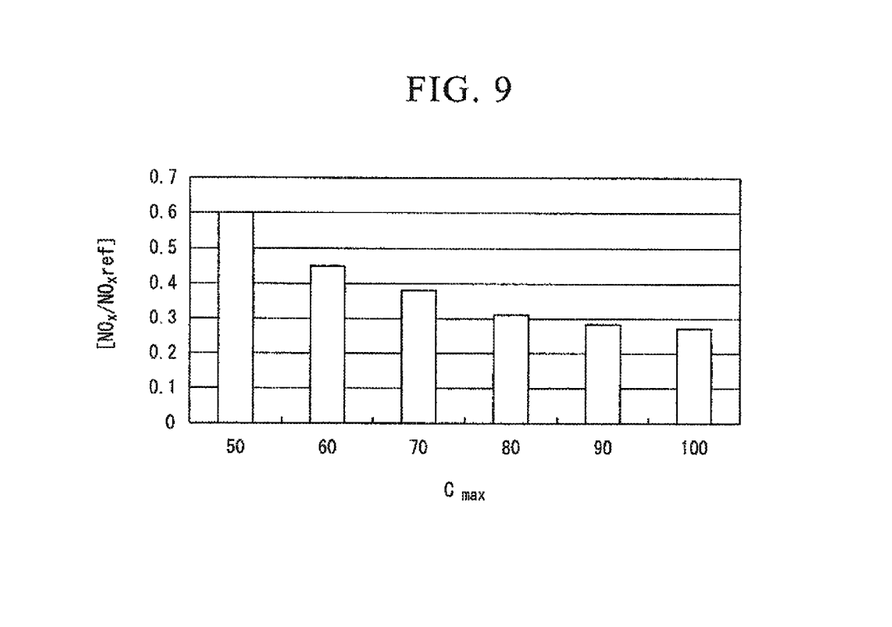
FIG. 9 is a graph showing a relationship between the upper limit of the oxygen concentration and NOx concentration in one Example of the present invention.

Moreover, in FIG. 9, the horizontal axis shows the maximum oxygen ($C_{max}$) in the oxidizing agent fluid, and the vertical axis shows a ratio between the NOx concentration and NOx (ref) (NOx/NOx (ref)). In FIG. 9, for example, the NOx concentration ratio when the oxygen concentration was periodically changed within a range from 33 to 70% is a value (0.38) corresponding to the point $C_{max}$ being 70.

TABLE 5

| $C_{max}$ | $C_{min} = 33$ |
|---|---|
| 50 | 0.6 |
| 60 | 0.45 |
| 70 | 0.38 |
| 80 | 0.31 |
| 90 | 0.28 |
| 100 | 0.27 |

It is clear from FIG. 9 that, when the changing range of the oxygen concentration is larger, larger NOx reduction effects can be obtained.

Example 7

In Example 7, the NOx concentration in the exhaust gas was measured by changing the flow rate of LNG, oxygen, air, and periodically changing the oxygen ratio and the oxygen concentration. Each of the period of the flow rate of LNG, the oxygen ratio, and oxygen concentration was adjusted such that the frequency was adjusted to 0.2 Hz. In addition, the phase difference between the flow rate of LNG and the oxygen ratio was adjusted to π, and they are adjusted such that the oxygen ratio is smaller when the flow rate of LNG is larger. Furthermore, the phase difference between the oxygen ratio and the oxygen concentration was π.

The oxygen concentration in the oxidizing agent fluid and the oxygen ratio were periodically changed within a range from 30 to 100% and 0.5 to 2.7, respectively. At this time, the oxygen, concentration in the oxidizing agent fluid and the oxygen ratio at the average time were adjusted to 40% and 1.05. The results are shown in FIG. 10.

Comparative Example 3

In Comparative Example 3, the NOx concentration was measured by fixing the flow rate of LNG, changing only the flow rate of oxygen and air to periodically change the oxygen ratio and the oxygen concentration. The phase difference between the oxygen ratio and the oxygen concentration was adjusted to π. The range of the oxygen concentration and the oxygen ratio were the same as those in Example 7. The results are also shown in FIG. 10.

Figure 10:
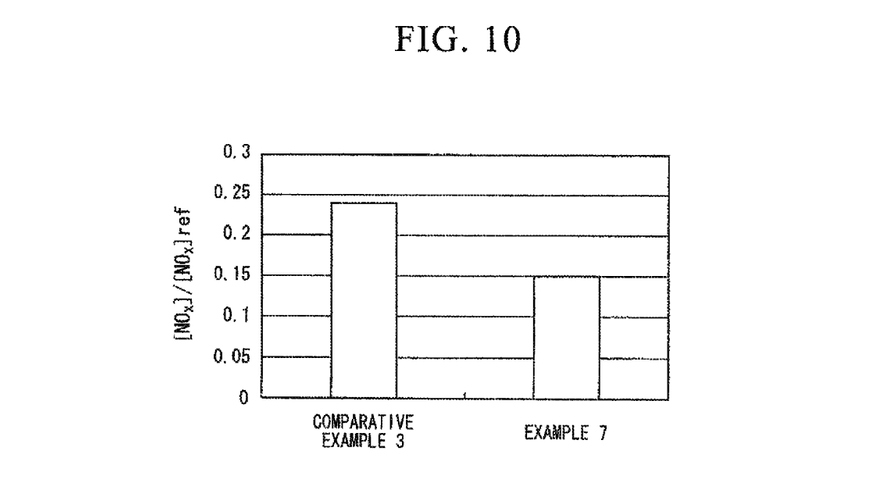
FIG. 10 is a graph showing a relationship between the flow rate of fuel and NOx concentration in one Example of the present invention.

It is clear from FIG. 10 that it is possible to decrease the NOx concentration by changing the flow rate of LNG.

Example 8

In Example 8, the influence to the NOx concentration by changing the phase difference between the oxygen ratio and the oxygen concentration to 0, π/2, π, and 3π/2 in a test in which the flow rate of LNG was fixed, and the flow rate of oxygen and air was changed to periodically change the oxygen, ratio and the oxygen concentration. Moreover, the frequency of the oxygen ratio and the oxygen concentration was 0.067 Hz, the oxygen concentration in the oxidizing agent fluid was periodically changed in a range from 33 to 100%, and the oxygen ratio was also periodically changed in a range from 0.5 to 1.6. At this time, the oxygen concentration in the oxidizing agent fluid and the oxygen ratio at the average time were adjusted to 40% and 1.05. The results are shown in FIG. 11.

Figure 11:
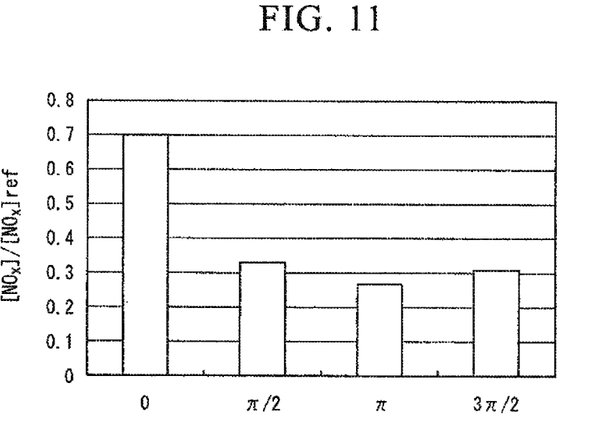
FIG. 11 is a graph showing a relationship between the phase difference between the oxygen ratio and the oxygen concentration, and NOx concentration in one Example of the present invention.

It is clear from FIG. 11 that when the phase difference between the periodical change of the oxygen ratio and the oxygen concentration is in a range from π/2 to 3π/2, the NOx concentration was low, and when the phase difference is π, the NOx concentration was lower.

INDUSTRIAL APPLICABILITY

According to the present invention, it is possible to obtain a method for burning a burner which reliably and remarkably decreases the amount of NOx generated. The present invention can be used not only when a new heating furnace is built but also to a combustion burner in an existing heating furnace.

EXPLANATION OF REFERENCE SYMBOL

1 combustion device
2 heating furnace
3 combustion flame
4 burner
5 fuel supply pipe
6 oxidizing agent supply pipe
7 oxygen supply pipe
8 air supply pipe
50, 70, 80 forced vibration device
51, 71, 81 open-close valve
52, 72, 82 control device

The invention claimed is:
1. A method for burning a burner in a heating furnace including a step of:
periodically changing at least one of a flow rate of a fuel fluid and a flow rate of an oxidizing agent fluid which are supplied to the burner while periodically changing an oxygen concentration in the oxidizing agent fluid, thereby an oxygen ratio which is calculated by dividing an amount of oxygen supplied by a theoretical necessary amount of oxygen is periodically changed, and the periodical change of the oxygen ratio is made different from the periodical change of the oxygen concentration to cause combustion in periodically vibrational conditions.

2. The method for burning a burner according to claim 1, wherein the periodical change of the flow rate of the fuel fluid is different from the periodical change of the oxygen concentration and the oxygen ratio.

3. The method for burning a burner according to claim 2, wherein the periodical change of the oxygen ratio and the oxygen concentration has the same frequency.

4. The method for burning a burner according to claim 1, wherein frequency of the periodical change of the oxygen ratio is 20 Hz or less.

5. The method for burning a burner according to claim 1, wherein frequency of the periodical change of the oxygen ratio is 0.02 Hz or more.

6. The method for burning a burner according to claim 1, wherein the difference between an upper limit and a lower limit of the oxygen ratio which periodically changes is 0.2 or more, and an average oxygen ratio in one period is 1.0 or more.

7. The method for burning a burner according to claim 6, wherein the periodical change of the oxygen ratio and the oxygen concentration has the same frequency.

8. The method for burning a burner according to claim 1, wherein the periodical change of the oxygen ratio and the oxygen concentration has the same frequency.

9. The method for burning a burner according to claim 8, wherein a phase difference between the periodical change of the oxygen ratio and the oxygen concentration is in a range from $\pi/2$ to $3\pi/2$.

10. The method for burning a burner according to claim 9, wherein a phase difference between the periodical change of the oxygen ratio and the oxygen concentration is $\pi$.

11. The method for burning a burner according to claim 1, wherein the periodical change of the flow rate of the fuel fluid and the oxygen ratio has the same frequency; and a phase difference between the periodical change of the flow rate of the fuel fluid and the oxygen ratio is in a range from $\pi/2$ to $3\pi/2$.

12. The method for burning a burner according to claim 11, wherein a phase difference between the periodical change of the oxygen concentration and the oxygen ratio is $\pi$.

13. The method for burning a burner according to claim 1, wherein the oxidizing agent fluid contains oxygen and air.

14. The method for burning a burner according to claim 13, wherein the oxygen is substantially pure oxygen.

15. The method for burning a burner according to claim 1, wherein the oxidizing agent fluid contains oxygen and combustion exhaust gas.

\* \* \* \* \*